(12) United States Patent
Eaton et al.

(10) Patent No.: US 8,894,100 B2
(45) Date of Patent: Nov. 25, 2014

(54) FITTING WITH DRAW MECHANISM

(71) Applicant: Romac Industries, Inc., Bothell, WA (US)

(72) Inventors: Delbert Eaton, Enumclaw, WA (US); Lee Getzewich, Issaquah, WA (US); David R. Albin, Bothell, WA (US)

(73) Assignee: Romac Industries, Inc., Bothell, WA (US)

( * ) Notice: Subject to any disclaimer, the term of this patent is extended or adjusted under 35 U.S.C. 154(b) by 18 days.

(21) Appl. No.: 13/724,933

(22) Filed: Dec. 21, 2012

(65) Prior Publication Data

US 2013/0241198 A1    Sep. 19, 2013

Related U.S. Application Data

(60) Provisional application No. 61/612,189, filed on Mar. 16, 2012.

(51) Int. Cl.

| | |
|---|---|
| *F16L 21/06* | (2006.01) |
| *F16L 17/04* | (2006.01) |
| *F16L 21/00* | (2006.01) |
| *F16L 21/04* | (2006.01) |
| *F16L 21/08* | (2006.01) |
| *F16L 25/14* | (2006.01) |

(52) U.S. Cl.
CPC ............... *F16L 17/04* (2013.01); *F16L 21/007* (2013.01); *F16L 21/04* (2013.01); *F16L 21/08* (2013.01); *F16L 25/14* (2013.01)
USPC ............ 285/323; 285/314; 285/369; 285/343

(58) Field of Classification Search
USPC .......... 285/339, 369, 343, 417, 323, 324, 314
See application file for complete search history.

(56) References Cited

U.S. PATENT DOCUMENTS

| | | | |
|---|---|---|---|
| 1,622,768 | A | 3/1927 | Cook et al. |
| 1,830,782 | A | 11/1931 | Burnish et al. |

(Continued)

FOREIGN PATENT DOCUMENTS

| | | |
|---|---|---|
| AU | 454905/93 | 3/1994 |
| CA | 491285 | 3/1953 |

(Continued)

OTHER PUBLICATIONS

Ringwej Coupling System, Romac Industries Inc. catalog, 4 pages, 1974.

(Continued)

*Primary Examiner* — David E Bochna
(74) *Attorney, Agent, or Firm* — Seed IP Law Group PLLC

(57) ABSTRACT

A fitting includes a hollow body, a sealing member, and a draw mechanism. The fitting mechanism includes a primary actuation element coupled with the body at a first end, and a plurality of secondary actuation elements coupled to the sealing member. The plurality of secondary actuation elements are positioned in an interior of the hollow body and circumferentially spaced from each other. The plurality of secondary actuation elements are also engaged with the primary actuation element such that actuation of the primary actuation element draws the plurality of secondary actuation elements axially towards the opening at the first end of the hollow body thereby translating the sealing member from an open position to a sealing position.

30 Claims, 13 Drawing Sheets

(56) References Cited

U.S. PATENT DOCUMENTS

| | | | |
|---|---|---|---|
| 1,898,623 A * | 2/1933 | Gammeter | 285/315 |
| 1,916,968 A | 7/1933 | Davis et al. | |
| 2,197,450 A * | 4/1940 | Curtis | 285/369 |
| 2,206,262 A | 7/1940 | Olt | |
| 2,259,453 A | 10/1941 | Beyer et al. | |
| 2,269,664 A | 1/1942 | Hallerberg | |
| 2,355,408 A | 8/1944 | Wyss | |
| 2,460,981 A | 2/1949 | Francisco, Jr. et al. | |
| 2,541,205 A | 2/1951 | Christophersen | |
| 2,645,506 A | 7/1953 | Sturgis | |
| 2,647,769 A * | 8/1953 | Smith | 285/369 |
| 2,741,497 A | 4/1956 | Risley | |
| 2,755,109 A | 7/1956 | Risley | |
| 2,778,661 A | 1/1957 | Leighton | |
| 2,822,190 A | 2/1958 | Burke | |
| 2,923,308 A | 2/1960 | Shohan | |
| 2,937,037 A | 5/1960 | Woolsey | |
| 2,985,291 A | 5/1961 | Schoepe et al. | |
| 3,001,567 A | 9/1961 | Barr | |
| 3,021,584 A | 2/1962 | Polanski | |
| 3,026,128 A | 3/1962 | Willis | |
| 3,029,946 A | 4/1962 | Wright, Jr. et al. | |
| 3,033,581 A | 5/1962 | Sims | |
| 3,059,941 A | 10/1962 | Kaynor et al. | |
| 3,113,791 A | 12/1963 | Frost et al. | |
| 3,124,367 A | 3/1964 | Kaynor | |
| 3,129,021 A | 4/1964 | Willis et al. | |
| 3,150,876 A | 9/1964 | Lafferty | |
| 3,250,538 A | 5/1966 | Albon | |
| 3,291,506 A | 12/1966 | Blakeley | |
| 3,298,698 A | 1/1967 | Condon | |
| 3,301,567 A | 1/1967 | Barr | |
| 3,315,970 A | 4/1967 | Holloway | |
| 3,351,352 A | 11/1967 | Blakeley et al. | |
| 3,386,745 A | 6/1968 | Hein | |
| 3,423,111 A | 1/1969 | Elsner | |
| 3,432,189 A | 3/1969 | Buller | |
| 3,464,722 A | 9/1969 | Larkin | |
| 3,485,515 A | 12/1969 | Frishof | |
| 3,486,772 A | 12/1969 | Elsner | |
| 3,680,894 A | 8/1972 | Young | |
| 3,695,638 A | 10/1972 | Blakeley | |
| 3,705,737 A | 12/1972 | Westerlund et al. | |
| 3,724,878 A | 4/1973 | Ford | |
| 3,724,880 A | 4/1973 | Seiler | |
| 3,727,951 A | 4/1973 | Shire et al. | |
| 3,733,092 A | 5/1973 | Yorke et al. | |
| 3,744,825 A | 7/1973 | Cooper et al. | |
| 3,756,629 A | 9/1973 | Gibb | |
| 3,797,079 A | 3/1974 | Nixon | |
| 3,810,665 A | 5/1974 | Rodgers | |
| 3,828,403 A | 8/1974 | Perrin et al. | |
| 3,838,873 A | 10/1974 | Gilbert | |
| 3,877,733 A | 4/1975 | Straub | |
| 3,920,270 A | 11/1975 | Babb, Jr. | |
| 3,960,275 A | 6/1976 | Haughton et al. | |
| 3,994,514 A | 11/1976 | Zimmerer et al. | |
| 4,101,151 A | 7/1978 | Ferguson | |
| 4,116,473 A | 9/1978 | Creus | |
| 4,119,333 A | 10/1978 | Straub | |
| 4,163,571 A | 8/1979 | Nash | |
| 4,268,072 A | 5/1981 | Straub | |
| 4,272,871 A | 6/1981 | Weinhold | |
| 4,326,737 A | 4/1982 | Lehmann | |
| 4,362,323 A | 12/1982 | Lodder et al. | |
| 4,364,588 A | 12/1982 | Thompson | |
| 4,380,348 A | 4/1983 | Swartz | |
| 4,402,533 A | 9/1983 | Ortloff | |
| 4,406,481 A | 9/1983 | Summerell | |
| 4,421,347 A | 12/1983 | Kantor | |
| 293,734 A | 2/1984 | Harrison | |
| 4,432,572 A | 2/1984 | Thalmann | |
| 4,461,498 A | 7/1984 | Kunsman | |
| 4,467,871 A | 8/1984 | Rollwitz | |
| 4,471,979 A | 9/1984 | Gibb et al. | |
| 4,480,860 A | 11/1984 | Foresta et al. | |
| 4,494,780 A | 1/1985 | Burnett | |
| 4,548,429 A | 10/1985 | Merz | |
| 4,561,678 A | 12/1985 | Kunsman | |
| 4,568,112 A | 2/1986 | Bradley, Jr. et al. | |
| 4,568,115 A | 2/1986 | Zimmerly | |
| 4,569,542 A | 2/1986 | Anderson et al. | |
| 342,189 A | 5/1986 | Deeds | |
| 4,629,217 A | 12/1986 | Straub | |
| 4,639,020 A | 1/1987 | Rung et al. | |
| 4,643,461 A | 2/1987 | Thau, Jr. et al. | |
| 4,643,464 A | 2/1987 | Weinhold | |
| 4,678,208 A | 7/1987 | De Raymond | |
| 4,685,705 A | 8/1987 | Jones | |
| 4,699,405 A * | 10/1987 | Miller | 285/369 |
| 4,702,499 A | 10/1987 | DeRaymond et al. | |
| 4,702,500 A | 10/1987 | Thau, Jr. et al. | |
| 4,702,886 A | 10/1987 | Kent | |
| 4,729,582 A | 3/1988 | Zeidler | |
| 4,753,461 A * | 6/1988 | Miller | 285/369 |
| 4,807,912 A | 2/1989 | Maier | |
| 4,810,832 A | 3/1989 | Spinner et al. | |
| 4,813,720 A | 3/1989 | Cassel | |
| 4,822,083 A | 4/1989 | Meinig | |
| 4,824,148 A | 4/1989 | Grabowski | |
| 4,838,582 A | 6/1989 | Hatakeyama et al. | |
| 4,886,304 A | 12/1989 | Kunsman | |
| 4,893,843 A | 1/1990 | DeRaymond | |
| 4,915,418 A | 4/1990 | Palatchy | |
| 4,919,453 A | 4/1990 | Halling et al. | |
| 4,940,261 A | 7/1990 | Somers Vine | |
| 5,018,768 A | 5/1991 | Palatchy | |
| 5,036,636 A | 8/1991 | Hasty | |
| 5,100,183 A | 3/1992 | Montesi et al. | |
| 5,180,193 A | 1/1993 | Rung et al. | |
| 5,203,594 A | 4/1993 | Straub | |
| 5,230,537 A | 7/1993 | Newman | |
| 5,248,169 A | 9/1993 | Barbe | |
| 5,257,834 A | 11/1993 | Zeidler et al. | |
| 5,271,648 A | 12/1993 | Krausz | |
| 5,273,322 A | 12/1993 | Straub | |
| 5,310,158 A | 5/1994 | Cassel | |
| 5,314,213 A | 5/1994 | Heister et al. | |
| 5,335,946 A | 8/1994 | Dent et al. | |
| 5,339,846 A | 8/1994 | Shelton et al. | |
| 5,358,286 A | 10/1994 | Eaton et al. | |
| 5,409,042 A | 4/1995 | Kirchner | |
| 5,431,453 A | 7/1995 | Yamashita et al. | |
| 5,476,290 A | 12/1995 | Bergmann et al. | |
| 5,476,292 A | 12/1995 | Harper | |
| 5,499,849 A | 3/1996 | Fend | |
| 5,509,702 A | 4/1996 | Warehime et al. | |
| 5,560,656 A | 10/1996 | Okamura et al. | |
| 5,588,267 A | 12/1996 | Rodriguez et al. | |
| 5,645,303 A | 7/1997 | Warehime et al. | |
| 5,697,194 A | 12/1997 | Gignac | |
| 5,772,253 A | 6/1998 | Hodge et al. | |
| 5,803,513 A | 9/1998 | Richardson | |
| 5,815,892 A | 10/1998 | Geppert | |
| 5,911,446 A | 6/1999 | McLennan et al. | |
| 5,941,576 A | 8/1999 | Krausz | |
| 5,992,905 A | 11/1999 | Kennedy, Jr. et al. | |
| 6,053,504 A | 4/2000 | Winterhoff et al. | |
| 6,070,914 A | 6/2000 | Schmidt | |
| 6,089,618 A | 7/2000 | Neumann et al. | |
| 6,106,029 A | 8/2000 | DeMore et al. | |
| 6,186,560 B1 | 2/2001 | Gill | |
| 6,279,963 B1 | 8/2001 | Hulsebos | |
| 6,293,556 B1 | 9/2001 | Krausz | |
| 6,311,712 B1 | 11/2001 | Meyer | |
| 6,390,122 B1 | 5/2002 | Zhang et al. | |
| 703,657 A | 7/2002 | Horn | |
| 6,470,538 B2 | 10/2002 | Richter | |
| 6,481,755 B2 | 11/2002 | Hulsebos et al. | |
| 6,481,762 B1 | 11/2002 | Rex et al. | |
| 6,533,331 B2 * | 3/2003 | Hulsebos et al. | 285/339 |
| 6,595,235 B1 | 7/2003 | Zhang | |
| 6,789,567 B2 | 9/2004 | Meyer | |
| 6,830,268 B2 | 12/2004 | Krausz et al. | |

(56) References Cited

U.S. PATENT DOCUMENTS

| | | | |
|---|---|---|---|
| 6,843,514 B2 * | 1/2005 | Rex et al. | 285/339 |
| 6,921,115 B2 | 7/2005 | Gill | |
| 6,983,764 B2 | 1/2006 | Arrowood, Jr. et al. | |
| 7,036,850 B2 | 5/2006 | Gill | |
| 7,048,309 B2 | 5/2006 | Gill | |
| 7,125,054 B2 | 10/2006 | Jones | |
| 7,232,160 B2 | 6/2007 | Krausz et al. | |
| 7,243,955 B2 | 7/2007 | Krausz et al. | |
| 7,252,310 B2 | 8/2007 | Amedure et al. | |
| 7,300,078 B2 | 11/2007 | Yamamoto et al. | |
| 7,310,867 B2 | 12/2007 | Corbett, Jr. | |
| 7,328,493 B2 | 2/2008 | Jones et al. | |
| 7,353,843 B2 | 4/2008 | Arrowood, Jr. et al. | |
| 7,455,331 B2 | 11/2008 | Gill | |
| 7,571,940 B2 * | 8/2009 | Krausz et al. | 285/343 |
| 7,625,018 B2 * | 12/2009 | Krausz et al. | 285/369 |
| 7,654,586 B2 | 2/2010 | Krausz et al. | |
| 7,748,753 B2 | 7/2010 | Krausz et al. | |
| 7,789,431 B2 * | 9/2010 | Freudendahl | 285/339 |
| 7,815,225 B2 | 10/2010 | Jones et al. | |
| 7,828,335 B2 | 11/2010 | Gill | |
| 7,837,238 B2 | 11/2010 | Krausz et al. | |
| 7,837,239 B2 | 11/2010 | Krausz et al. | |
| 7,850,213 B2 | 12/2010 | Gill | |
| 7,997,626 B2 * | 8/2011 | Krausz et al. | 285/369 |
| 8,186,723 B2 * | 5/2012 | Kim | 285/339 |
| 8,444,187 B2 * | 5/2013 | Bekki | 285/343 |
| 8,505,985 B2 * | 8/2013 | Nijsen et al. | 285/323 |
| 2002/0109355 A1 | 8/2002 | Elliott | |
| 2004/0089349 A1 | 5/2004 | Meyer | |
| 2004/0194836 A1 | 10/2004 | Arrowood, Jr. et al. | |
| 2005/0146133 A1 | 7/2005 | Snyder et al. | |
| 2006/0000598 A1 | 1/2006 | Arrowood, Jr. et al. | |
| 2006/0192384 A1 | 8/2006 | Lundstrom | |
| 2006/0214422 A1 | 9/2006 | Cuvo et al. | |
| 2006/0265852 A1 | 11/2006 | Snyder et al. | |
| 2006/0267343 A1 | 11/2006 | Wright | |
| 2007/0040336 A1 | 2/2007 | Sun et al. | |
| 2007/0085341 A1 | 4/2007 | Walmsley et al. | |
| 2007/0273151 A1 | 11/2007 | Krausz et al. | |
| 2008/0272595 A1 | 11/2008 | Gibb et al. | |
| 2010/0289256 A1 | 11/2010 | Shumard | |
| 2010/0289257 A1 | 11/2010 | Madara et al. | |
| 2010/0314864 A1 | 12/2010 | Lemke et al. | |

FOREIGN PATENT DOCUMENTS

| | | |
|---|---|---|
| CA | 628321 | 10/1961 |
| CA | 1267177 | 3/1990 |
| CA | 2104553 | 8/1990 |
| CH | 614905 | 12/1977 |
| DE | 1271473 | 6/1968 |
| DE | 2158816 | 7/1972 |
| DE | 3111997 | 10/1982 |
| DE | 3237627 | 4/1984 |
| DE | 3926432 | 2/1991 |
| DE | 4422116 | 8/1995 |
| DE | 208911 | 4/2009 |
| EP | 0079457 | 5/1983 |
| EP | 0223668 | 5/1987 |
| EP | 0403379 | 12/1990 |
| EP | 0492921 | 7/1992 |
| EP | 0521232 | 1/1993 |
| EP | 0551548 | 7/1993 |
| EP | 0584784 | 3/1994 |
| FR | 1421443 | 11/1965 |
| FR | 2775753 | 9/1999 |
| GB | 748033 | 4/1956 |
| GB | 749664 | 5/1956 |
| GB | 1317758 | 5/1973 |
| GB | 1334258 | 10/1973 |
| GB | 1446718 | 8/1976 |
| GB | 2051213 | 1/1981 |
| GB | 2094385 | 9/1982 |
| GB | 2098297 | 11/1982 |
| GB | 2453608 | 4/2009 |
| IL | 102960 | 1/1995 |
| IL | 97236 | 6/1997 |
| IL | 114078 | 11/1997 |
| IL | 94399 | 1/1999 |
| JP | 53-129716 | 10/1978 |
| JP | 58-65483 | 5/1983 |
| JP | 60-69885 | 5/1985 |
| JP | 61-106685 | 7/1986 |
| JP | 62-87283 | 6/1987 |
| JP | 9159086 | 6/1997 |
| JP | 2005-42740 | 2/2005 |
| JP | 2006-329290 | 12/2006 |
| KR | 20030050647 | 6/2003 |
| WO | 96/41983 | 12/1996 |

OTHER PUBLICATIONS

American Pipe Manual, 19$^{th}$ ed., Section 9, "American Restrained Joint Pipe," 36 pages, Jul. 27, 2011.

EBAA IRON—Series 1100TDM, brochure, 4 pages, 2011.

JCM Mar. 2010 Product Directory SFS, catalog, 98 pages, Mar. 2010.

Sigma ONE-LOK™ Series D-SLCE for PVC Pipe, brochure, 4 pages, 2011.

Sigma ONE-LOK™ Series SLDE for Ductile Iron Pipe, brochure, 4 pages, 2011.

Sigma PV-LOK™ Series PWP for use on Ductile Iron Pipe, brochure, 2 pages, 2010.

Smith-Blair, catalog, 20 pages, Nov. 2011.

Tyler Union Utilities Catalog, 65 pages, Feb. 2008.

UNI-FLANGE Pipe Restraints and Adapter Flanges, catalog, 60 pages, 2011.

Victaulic—Coupling Style 31, catalog, 3 pages, 2012.

Second Amended Complaint for Patent Infringement and Jury Demand, *Krausz Industries, Lte. et al.* v. *Romac Industries, Inc. et al.*, U.S. District Court for the Western District of New York, Case No. 6:09-cv-06300-DGL. Jan. 11, 2010.

* cited by examiner

FITTING WITH DRAW MECHANISM

CROSS-REFERENCE TO RELATED APPLICATIONS

This application claims the benefit under 35 U.S.C. §119 (e) of U.S. Provisional Patent Application No. 61/612,189, filed Mar. 16, 2012, the contents of which is incorporated herein by reference in its entirety.

BACKGROUND

1. Technical Field

The present disclosure relates to fittings, such as pipe couplings, pipe connectors, and pipe end caps.

2. Description of the Related Art

The waterworks, oil, gas, and chemical industries generally employ pipes or other hollow bodies to transport water and other fluids. Fittings are structural elements that are typically employed to mechanically couple individual pipes or other hollow bodies to other system components. For example, a fitting can act as a connection component in conjunction with a valve, a hydrant, or a flange end. In addition, some pipes include an integrated fitting type structure on one end to facilitate coupling. Fittings are installed in both above ground and below ground applications. For example, they can be used in manufacturing plants for a variety of applications, including on conduit, such as electrical conduit or on heating, ventilation, and air conditioning applications. The materials used for pipes or other hollow bodies, such as conduits, can vary depending on the application. As such, particular fittings have been developed for use with particular materials, such as steel, cast iron, cement, plastic, and other kinds of materials.

The size of the pipe or other hollow body can also vary depending on the application. Accordingly, fittings have been developed that flexibly couple hollow bodies having different diameters. These fittings typically rely on adjustable seals.

One type of conventional fitting is a pipe coupling that is configured to couple pipes of varying size includes a series of parallel bolts distributed circumferentially around a cylindrical body adapted to receive the pipe. In order to achieve a seal, the bolts pull a ring, on the end of the fitting, inwardly to wedge a seal between the pipe, the fitting body and the ring, from the outside toward the inside.

Another aspect of pipe coupling relates to axial restraint of the pipes to prevent de-coupling. Some conventional restraint systems include grippers that are wedged between the pipe coupling and the pipe to prevent axial translation of the pipe relative to the coupling. In some pipe couplings, the grippers are teeth that are embedded as part of a seal. In other conventional pipe couplings, axial restraint is achieved with a series of lugs that are located separate from a sealing gasket and are arranged circumferentially around a pipe in a ring. Radially tightening an individual bolt associated with each respective lug secures the lugs to the pipe to create the desired restraint.

Other conventional couplings employ a band-clamp that can be radially tightened about the pipe. These couplings can employ, in one example, steel bands or rings that surround the pipe to achieve restraint.

BRIEF SUMMARY

It has been recognized that conventional fittings, such as pipe couplings, that employ a series of parallel bolts can be problematic for a number of reasons. For example, a worker who installs a pipe coupling on-site in a ditch will need to tighten the series of bolts incrementally around the circumference of the coupling in order for the seals to be seated properly. One advantage of reducing the number of bolts needed for a coupling is that it tends to be quick and easy to install, in lieu of the larger number of bolts that are typical to systems that pull a ring toward the fitting body and compress the seal.

In one embodiment, a fitting of the present disclosure includes a draw mechanism that pulls an annular seal axially outward to form an effective seal with pipes of varying sizes and materials. The fitting includes a hollow body that includes an opening at a first end. A sealing member is positioned on an interior surface of the hollow body. The draw mechanism includes a primary actuation element coupled with the hollow body at the first end and a plurality of secondary actuation elements coupled to the sealing member. The plurality of secondary actuation elements are positioned in an interior of the hollow body and circumferentially spaced from each other. The plurality of secondary actuation elements are engaged with the primary actuation element such that actuation of the primary actuation element draws the plurality of secondary actuation elements axially towards the opening at the first end of the hollow body, thereby translating the sealing member from an open position to a sealing position.

In a further embodiment, the fitting can include a gripping element coupled to one of the plurality of secondary actuation members such that the gripping element is moved axially towards the opening at the first end of the hollow body and radially inward towards the longitudinal axis of the hollow body from an open position to an engaged position by actuating the primary actuation element. The gripping element can abut the sealing member.

In one embodiment, the gripping element is not fixedly attached to either of the one of the plurality of secondary actuation members or the sealing member. This advantageously can allow for the gripping element to float relative to the hollow body and accommodate varying pipe sizes and cross-sectional shapes.

In another embodiment, the fitting includes a plurality of gripping elements. The number of gripping elements may be less than the number of secondary actuation elements. In other example, there may be more gripping elements than secondary actuation elements, depending on how the gripping elements are structured.

The primary actuation element may be rotatably mounted to an exterior surface on the first end of the hollow body. The first end of the hollow body may include a plurality of circumferentially spaced tapered tabs that converge towards the longitudinal axis at the first end. Adjacent ones of the tabs are separated in the first circumferential direction by longitudinally extending slots. The secondary actuation members can each extend through a respective one of the longitudinally extending slots.

In one embodiment, the primary actuation element includes a plurality of sloped surfaces and each one of the secondary actuation elements is engaged with a respective one of the plurality of sloped surfaces.

In one embodiment, the primary actuation element is rotatably coupled with the hollow body at the first end and rotation of the primary actuation element in a first circumferential direction with respect to the longitudinal axis of the hollow body draws the plurality of secondary actuation elements axially towards the opening at the first end of the hollow body thereby translating the sealing member from an open position to a sealing position.

In one embodiment, the hollow body is coupled to the primary actuation element such that the primary actuation element is rotated in the first circumferential direction by actuating at least one bolt. The bolt can extend from a first bolt receiver that extends from the hollow body to a second bolt receiver that extends from the primary actuation element. The first and second bolt receivers are positioned such that actuating the bolt causes the primary actuation element to rotate in the first circumferential direction. Actuating the bolt can include tightening the bolt so as to move the second bolt receiver towards the first bolt receiver.

In another embodiment, a fitting includes a hollow body, an annular sealing member, and an actuation mechanism. The hollow body includes an opening at a first end. The annular sealing member is positioned on an interior surface of the hollow body. The actuation mechanism is configured to draw the sealing member axially towards the first end of the hollow body and radially inward towards a longitudinal axis of the hollow body by actuating at least one bolt that is coupled to the hollow body and the actuation mechanism. The at least one bolt extends substantially transverse to the longitudinal axis of the hollow body.

The fitting can also include a plurality of restraining elements that are circumferentially arranged on the interior surface of the hollow body. The plurality of restraining elements can be arranged axially between the sealing member and the first end of the hollow body.

The actuation member can include a ring rotatably mounted to the hollow body and a plurality of follower elements. Each of the follower elements are coupled to the annular sealing ring. The at least one bolt can be coupled to the ring such that actuating the at least one bolt causes the ring to rotate in a circumferential direction with respect to the hollow body, and the plurality of follower elements engage the ring such that rotation of the ring causes the plurality of follower elements to translate towards the first end of the hollow body.

In another aspect, a plurality of restraining elements can be arranged circumferentially on the interior surface of the hollow body between adjacent follower elements and axially between the sealing member and the first end of the hollow body.

In one embodiment, the ring can include a plurality of cam surfaces that vary in axial length along the circumferential direction. Each one of the follower elements can include an engagement portion that engages a respective one of the cam surfaces of the ring. The engagement portion of each of the follower elements can be a hook. The hook can include a sloped portion that corresponds in shape to an axial end surface of the cam surfaces of the ring.

In one embodiment, the ring can be mounted to an external surface of the hollow body. The first end of the hollow body can include a plurality of circumferentially spaced slots that extend through the hollow body from the external surface of the hollow body to the internal surface of the hollow body and that extend substantially parallel to the longitudinal axis of the hollow body. The hook on each one of the follower elements extends through a respective one of the slots in the hollow body.

The first end of the hollow body can include a first taper that extends towards the longitudinal axis of the hollow body. The cam surfaces of the ring can include a second taper that is complementary to the first taper.

In one embodiment, the ring can include a first bolt receiver, the hollow body can include a second bolt receiver, and the single bolt extends through the first and second bolt receivers.

In one embodiment, the annular sealing member includes a substantially trapezoidal cross-section.

In one embodiment, each follower element includes a stem that extends axially from the engagement portion to a base portion. The base portion is coupled to the annular sealing member. Each of the restraining elements can include a recess that extends through the restraining element in a direction substantially parallel to the longitudinal axis of the hollow body, and a stem of a respective one of the follower elements can be seated in the recess. Each of the recess of each restraining element can includes a first ramp portion that is complementary to a second ramp portion of the stem of a corresponding one of the follower elements.

In another embodiment, a fitting has a hollow body or barrel portion with at least one open end for receiving the end of a pipe. The barrel portion has an inside or interior tapered surface that converges around an axis, in a direction moving toward the open end of the barrel portion (from inside the barrel portion toward the outside). An annular gasket or seal can be located in the barrel portion between the tapered surface just described and the pipe. The annular seal has an outer surface that slides against, and is in contact with, the tapered surface; and an inner surface that similarly contacts and surrounds the pipe. A draw mechanism pulls the annular seal axially outwardly, against the tapered surface, and wedges the seal between the tapered surface and pipe. In this example, the wedging action works from inside in a direction toward the outside, rather than outside-in.

The draw mechanism can be mechanically linked to a rotatable bolt mechanism that is aligned substantially perpendicularly relative to the seal's axial path of travel. The mechanical linkage translates the perpendicular tightening force of the bolt mechanism into a pulling force that parallels the seal's path of travel, thus wedging the seal as described above.

The fitting of this embodiment can be built with or without restraint. To achieve restraint, gripper members can be positioned on an annular side of the seal that normally faces the open end of the barrel portion (or facing toward the outside). As the draw mechanism pulls the seal outwardly, the gripper members are pulled outwardly at the same time, ahead of the seal, to wedge the seal and gripper members at the same time (between the barrel portion and pipe).

In one embodiment, the fitting may include a multi-layer seal that has a removable layer. The removable layer can further facilitate the range of pipe diameters that are compatible with the fitting without necessitating a change in the size of the barrel portion. For example, removal of the seal's inner layer can allow the seal to fit around a larger pipe.

In one embodiment, the draw mechanism includes a rotatable end ring that surrounds the barrel portion's open end. The end ring has sloped surfaces distributed around it. An annular seal can carry a plurality of draw linkages, each one having an inner portion connected to the annular seal and an outer portion that engages with one of the sloped surfaces of the end ring—in sliding contact with the sloped surface. As the end ring rotates, the sloped surfaces draw the linkage axially outwardly. This, in turn, draws the annular seal outwardly (with the gripper members). In some examples, counter-rotation of the end ring releases or relaxes the draw linkage and seal. The collection of draw linkages and sloped surfaces can cooperate to draw the seal outwardly in a generally symmetric fashion.

The individual gripper members can have pointed gripper teeth that are oriented or directed radially inwardly toward the pipe. In one embodiment, there is one gripper member corresponding to each draw linkage. In other embodiments, the number of grippers is less than the number of draw linkages. As described above, the collection of gripper members are pulled axially outwardly, as the draw mechanism pulls and slides the seal axially outwardly.

In one embodiment, the end ring rests on an outside annular shoulder of the barrel portion. In this example, annular shoulder of the barrel portion also has a partly tapered surface that symmetrically converges away from the annular shoulder. However, as will be readily apparent to one having ordinary skill in the art upon review of the present disclosure in its entirety, the end ring can be coupled to the barrel portion in a number of ways without departing from the spirit of the present disclosure.

In another aspect, the barrel portion has a plurality of draw linkage slots through which each linkage extends. These slots prevent the seal from rotating while it is pulled outwardly. They also enable the draw linkages to take full advantage of the draw length provided by each sloped section of the end ring.

BRIEF DESCRIPTION OF THE SEVERAL VIEWS OF THE DRAWINGS

In the Figures, identical reference numbers identify similar elements or acts.

FIG. 22b is a view of the gasket assembly of the coupling of FIG. 22a; and

FIG. 22c is a view of two grippers and a draw hook assembly of the coupling of FIG. 22a.

DETAILED DESCRIPTION

Figure 1:
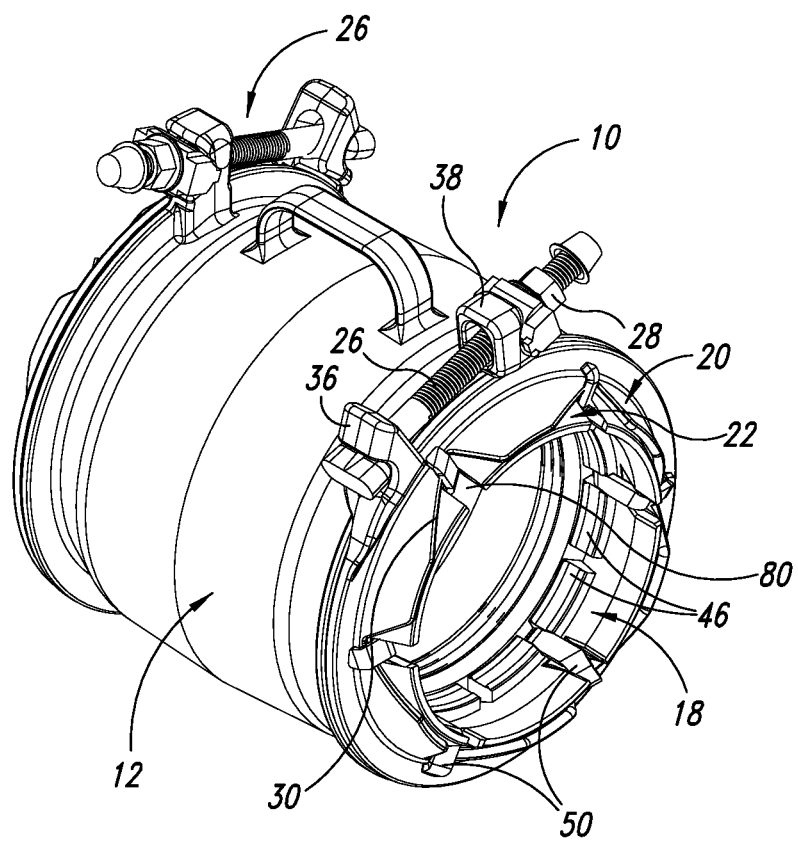
FIG. 1 is an isometric view of a pipe coupling system in accordance with one embodiment of the present disclosure.

In the following description, certain specific details are set forth in order to provide a thorough understanding of various embodiments of the invention. However, one skilled in the art will understand that the invention may be practiced without these details.

Unless the context requires otherwise, throughout the specification and claims which follow, the word "comprise" and variations thereof, such as "comprises" and "comprising" are to be construed in an open, inclusive sense, that is, as "including but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

I. System Overview

In one aspect, a fitting of the present disclosure can achieve both sealing and restraint over a wide range of pipe sizes, including sizes ranging from Iron Pipe Size (IPS) to Ductile Iron (DI) and beyond. In one example, the fitting is internally restrained to a hollow body and backed by a gasket seal. Segmented restraining elements are coupled to a circumferential elastomeric gasket positioned inside a cone shaped surface of the hollow body. As the restraining elements are drawn down the cone by a draw mechanism, they contract, along with the gasket, down on to a pipe achieving both sealing and restraint on the pipe. As internal pressure increases within the pipe after the fitting is installed, the gasket and restraining elements are further energized to seal and restrain the pipe.

Advantageously, the fitting of the present disclosure accommodates a variety of field conditions, such as dirt, pipe corrosion, pipe variability and pipe deflection relative to the fitting. For example, depending on the working environment, it can be difficult to ensure that a pipe and a fitting, such as a pipe coupling, are entirely axially aligned when the pipe coupling is installed. Instead, the longitudinal axis of the pipe may be deflected at an angle relative to the longitudinal axis of the coupling during installation. This misalignment may result from, for example, settlement, the inaccuracies of pipe installation, and tight working conditions in a trench. The fitting of the present disclosure can, in some examples, achieve consistent coupling, restraint, and sealing even when the longitudinal axis of the pipe is deflected by, for example, up to 8° relative to the longitudinal axis of the coupling. This is particularly advantageous to make up misalignment of pipe which is typical to most applications.

The fitting of the present disclosure also improves the ease of installation. Conventional fittings, such as pipe couplings, that achieve both restraint and sealing typically employ a series of parallel bolts that extend in the longitudinal direction of the coupling, and a series of bolts that extend radially from the coupling. The parallel bolts are tightened incrementally around the circumference of the coupling in order for the seals to be seated properly. The radially extending bolts are then tightened to achieve restraint. This process is not only time consuming, but can be difficult to achieve depending on the working conditions at a particular installation site.

The fitting of the present disclosure employs a draw mechanism that can, in some examples, be operated by actuating a single bolt that extends in a direction transverse to the longitudinal direction of the pipe. This design allows for easier access to the bolt during installation, reduces the amount of time for installation, and reduces the amount of space needed for an installation. Reducing the amount of space required for installation means that the trench dug to accommodate the fitting need not be as large as for conventional pipe couplings. The single bolt design offers an added element of safety for the installer as they are no longer required to work in the bottom of the ditch. All of these benefits lead to cost savings and improved ease at the time of installation. Other examples can employ actuation elements other than a bolt, or multiple bolts that extend transverse to the longitudinal direction of the fitting.

Not only does the draw mechanism of the present disclosure allow the restraint mechanism to achieve restraint for pipes with a wide range of outside pipe diameters, but the draw mechanism allows the restraint to be easily disengaged, even after the pipe has been pressurized and then depressurized.

It has been further recognized that some conventional restraint systems can act to disengage the gasket used in sealing. By contrast, the sealing and restraint aspects of the coupling system of the present disclosure work together and, in some examples, can be further energized by pressurization in the pipe.

Figure 2:
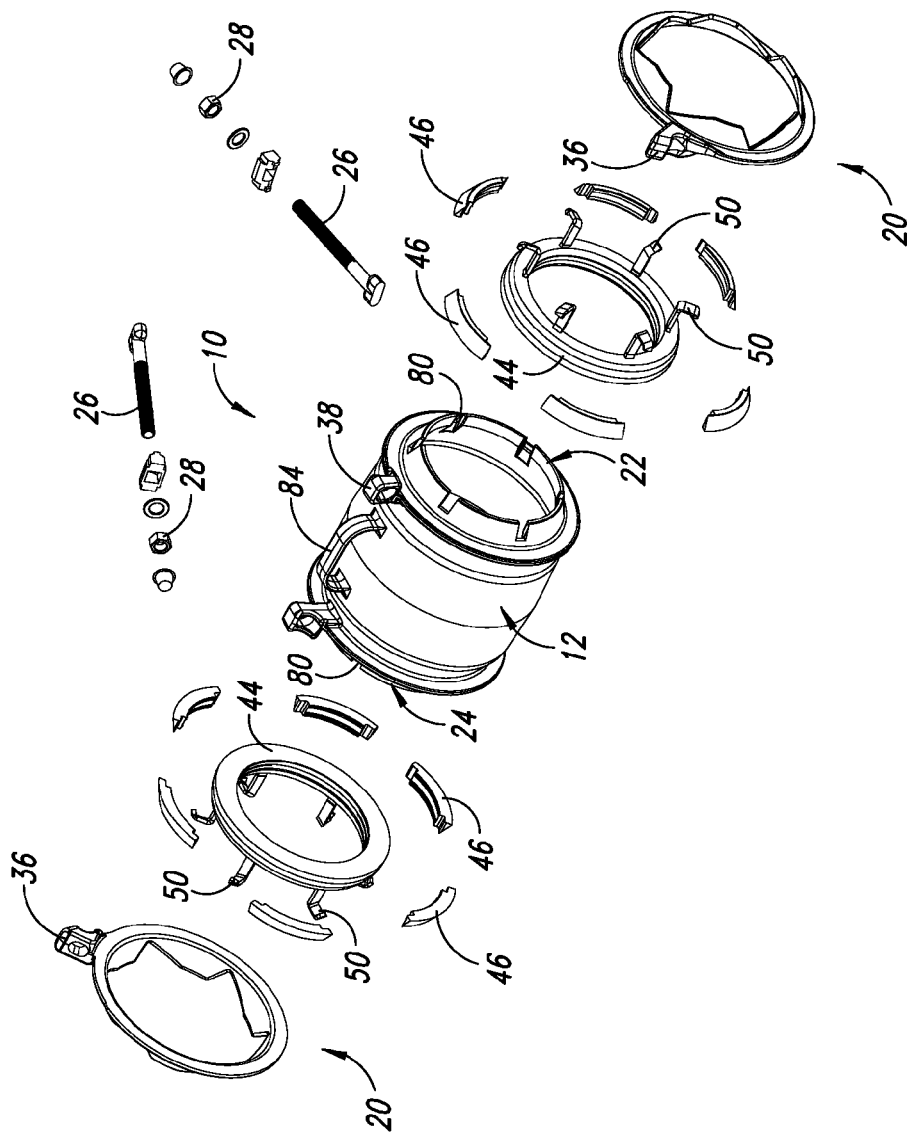
FIG. 2 is an exploded view of the pipe coupling illustrated in FIG. 1.
Figure 3:
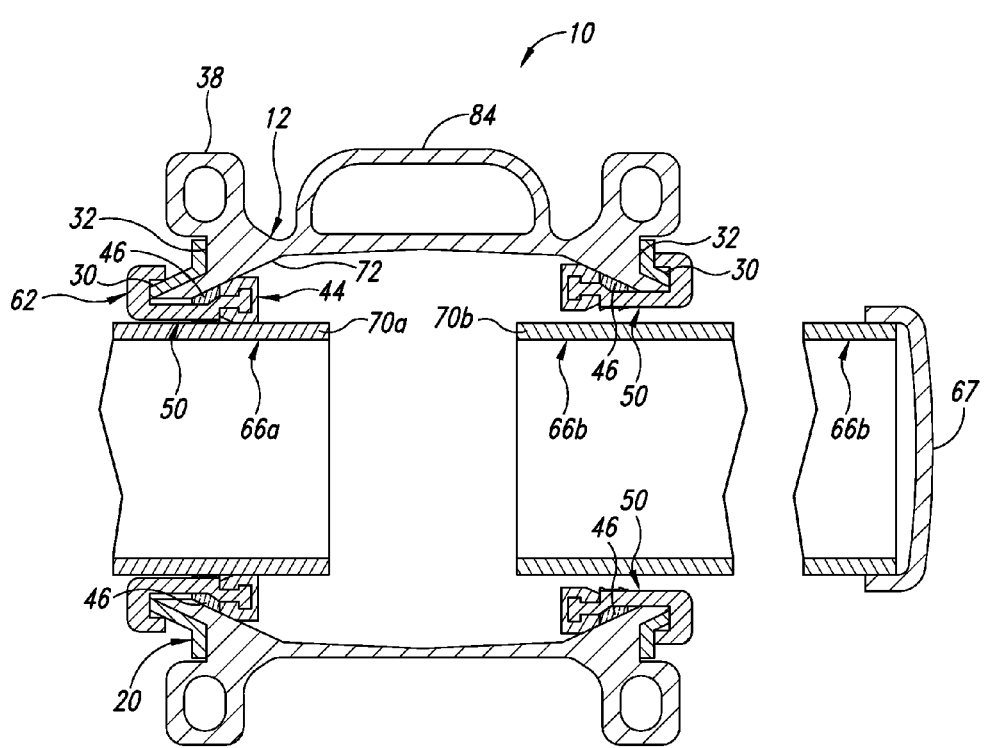
FIG. 3 is a side cross-sectional view illustrating the operation of the pipe coupling illustrated in FIGS. 1 and 2.

FIGS. 1-3 provide an overview of a fitting according to one example embodiment of the present disclosure. In this example, the fitting is a pipe coupling system. FIG. 1 is an isometric view of a fitting 10 in accordance with one embodiment of the present disclosure. FIG. 2 is an exploded view of the fitting 10 illustrated in FIG. 1. FIG. 3 is a side cross-sectional view illustrating the operation of the fitting 10 illustrated in FIGS. 1 and 2.

In this example, the fitting 10 includes a generally cylindrical and tubular body or barrel sleeve 12. Each end of the sleeve 12 includes an opening into which a pipe can be inserted. The barrel sleeve 12 is a hollow body that provides a fluid passageway that connects the ends of two pipes together. However, the inventive concepts of the present disclosure are also applicable to other fittings that include hollow bodies. For example, fittings of a "T" coupling, a single-end coupling, or an end cap, depending on the application all include hollow bodies that are encompassed within the present disclosure. In other examples, the fitting can be employed as a connection component in conjunction with a valve, a hydrant, or a flange end, all of which include hollow bodies. Pipes may also be configured so that one or both ends include the disclosed fitting configuration. For example, a pipe can include an integrated fitting type structure on one or both ends to facilitate coupling. The fitting of the present application can be employed in a variety of applications and is not limited to waterworks. For example, the fitting of the present disclosure can be employed in connections used in the oil, gas, or chemical industries. The fitting of the present application is applicable to installations intended for placement both above ground and below ground. For example, the fitting can be used in manufacturing plants for a variety of applications, including on conduit, such as electrical conduit or on heating, ventilation, and air conditioning applications.

An end ring 20, several lugs 50, several grippers 46, a gasket 44, and a single bolt 26 are installed on each end of the sleeve 12. The single bolt 26 extends through two bolt receivers 36, 38 that are respectively positioned on the end ring 20 and the sleeve 12.

The end ring 20 is rotatably mounted on an end of the sleeve 12. As seen in FIGS. 1 and 3, the lugs 50 connect the gasket/gripper assembly 18 to the end ring 20. These lugs 50 are positioned within slots 80 in the sleeve 12. The slots 80 prevent the lugs 50 from rotating with respect to the sleeve 12, but allow longitudinal motion along the axis of the coupling.

Figure 4:
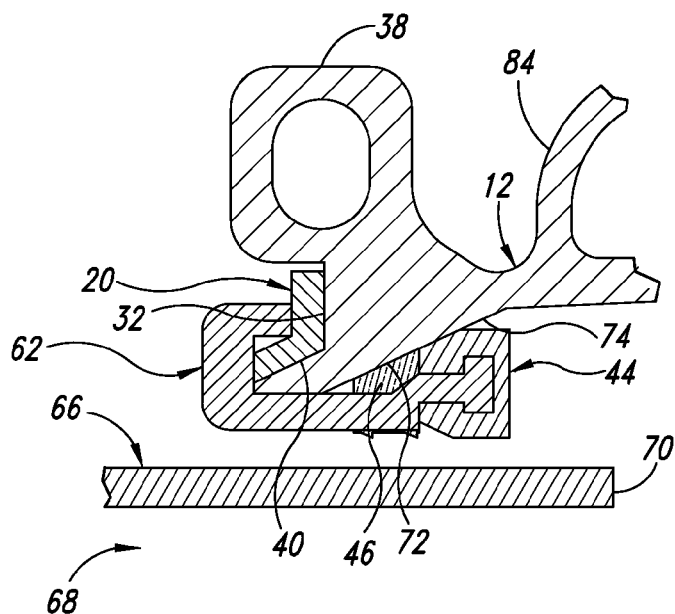
FIG. 4 is an enlarged sectional view of the seal section illustrated in FIG. 3 in an open configuration.
Figure 5:
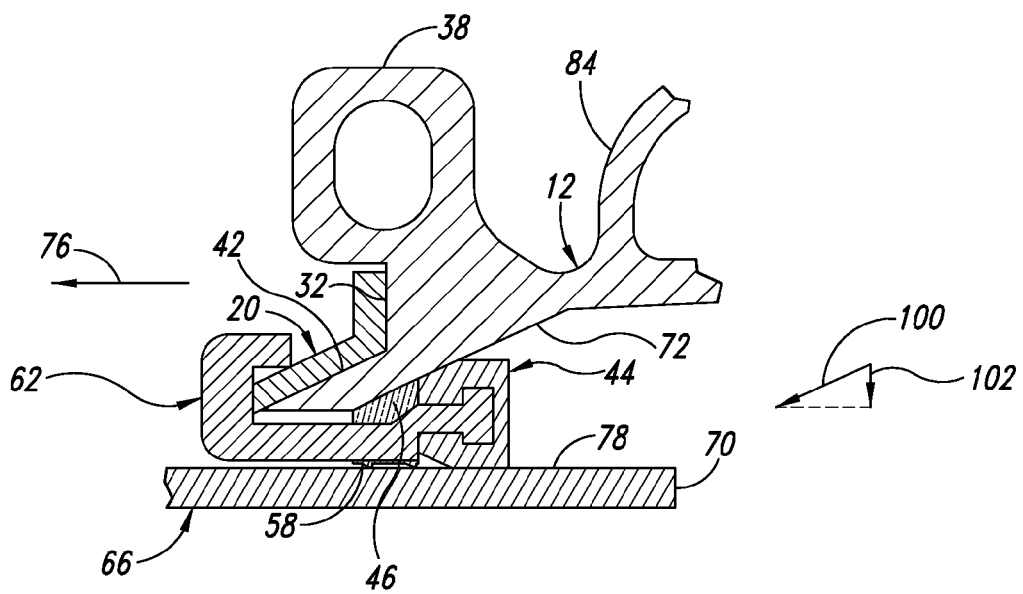
FIG. 5 is an enlarged sectional view of the seal section illustrated in FIG. 3 in an engaged configuration.

FIGS. 3-5 show how the coupling engages a pipe. FIG. 3 illustrates the coupling of two pipes 66a and 66b, and FIGS. 3 and 4 respectively illustrate a fitting in open and closed states relative to a pipe 66. The right side of FIG. 3 illustrates a fitting in an open state in which it is disengaged from a portion of a pipe 66b that is adjacent to an inner-most end 70b of the pipe 66b. The left side of FIG. 3 illustrates the fitting in a coupled state, in which it is engaged with a portion of a pipe 66a that is adjacent to an inner-most end 70a of the pipe 66a. Actuating the end ring 20 translates rotational motion of the end ring 20 into longitudinal movement of the lugs 50 that draws both the gasket 44 and the gripper elements 46 down the face of an internal cone of the sleeve 12. In greater detail, tightening the bolt 26 causes the end ring 20 to rotate with respect to the sleeve 12. As the end ring 20 rotates, the lugs 50 ride up along ramp sections 30 on the end ring 20, effectively pulling the lugs out axially away from the sleeve 12, while simultaneously drawing the lugs 50 radially inward towards the center axis of the pipe.

The longitudinal movement of the lugs 50 draws the combined gripper/gasket assembly 18 down into contact with the pipe to effect a seal and engage the restraints. As the lugs 50 move away from the body of the sleeve 12, they draw the gripper/gasket assembly 18 down the internal cone surface of the sleeve 12 towards the opening in the end of the sleeve 12. This brings the gripper segments 46 closer together and compresses the rubber gasket 44. The rubber gasket 44 eventually comes in contact with the outer surface of the pipe and begins to effect a seal. As the system continues to be tightened, the gasket 44 continues to be compressed between the pipe and the sleeve 12. Tightening continues until the gripper elements 46 eventually become wedged between the pipe and the inner surface of the sleeve 12, thus initiating the restraint engagement. When the pipe 66 is pressurized (or the pipes 66a and 66b in the example in FIG. 3), the gasket is further forced down into its sealing cavity between the pipe and the sleeve 12, and the restraints are similarly driven down to a tighter grip on the pipe, as the internal pressure increases. However, the present disclosure is not limited solely to fittings that are further energized with the addition of pressure. In other examples, complete engagement and sealing is achieved regardless of the pressure that flows through the pipe 66.

With this configuration, a single bolt with relatively low torque is all that is necessary for assembly. Bolt tightening forces act to create the initial seal and set the restraints.

System internal pressure and pipe retraction forces act to energize the seals and restraints beyond this initial set. The coupling restrains to the sleeve 12, and does not rely on bolts or end rings to support the pressure or restraint forces.

The various aspects of the coupling of the present disclosure will now be described in greater detail.

II. Center Sleeve

Referring to FIG. 3, the barrel sleeve 12 has an annular surface or shoulder 32 on each end. The shoulder 32 provides a resting place for a similarly shaped annular portion 34 of the end ring 20. In this manner, the annular portion of the end ring 20 rests in sliding contact with the corresponding annular surface 32 on the barrel sleeve such that the end ring 20 is rotatable relative to the barrel sleeve 12. Although the present example includes an annular surface or shoulder, the present disclosure also encompasses other mounting structures that allow the end ring to rotate relative to the sleeve 12, as will be readily apparent to those having ordinary skill in the art upon review of the present disclosure in its entirety.

III. End Ring

Figure 6:
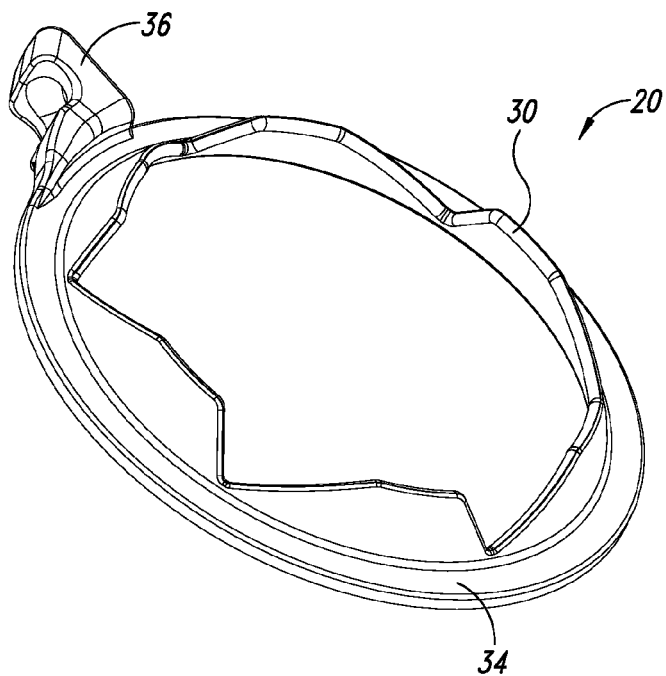
FIG. 6 is a view of an end ring in one embodiment.

Referring to FIG. 6, the end ring 20 has a plurality of sloped surfaces 30 or ramp sections. Each sloped surface serves as a camming surface that tightens the gasket assembly 18 about the pipe.

The end ring 20 is turned on the coupling 10 by one of the tightening bolts 26. The end ring 20 is preferably made with a bolt receiver 36 that works in cooperation with a similar bolt receiver 38 on the barrel sleeve 12. In one embodiment, tightening the bolt acts to draw the bolt receivers 36 and 38 towards each other so as to drive the rotation of the end ring 20. Depending on the construction of the bolt receivers, and how the bolt is mounted thereto, loosening the bolt can also serve to drive the end ring 20 in the opposite rotational direction.

The plurality of ramp sections 30 are collectively tapered inwardly, relative to the ring's annular portion 34, so that they slope or converge toward the center of the end ring 20. The convergence of the ramp sections 30 is also illustrated at 40 in FIG. 4. The outer end opening of the barrel sleeve has a similarly shaped converging surface 42 that also partly supports sliding rotation of the end ring 20, near the junction of the end ring's ramp sections 30 and annular portion 34.

IV. Gasket Assembly

Figure 7:
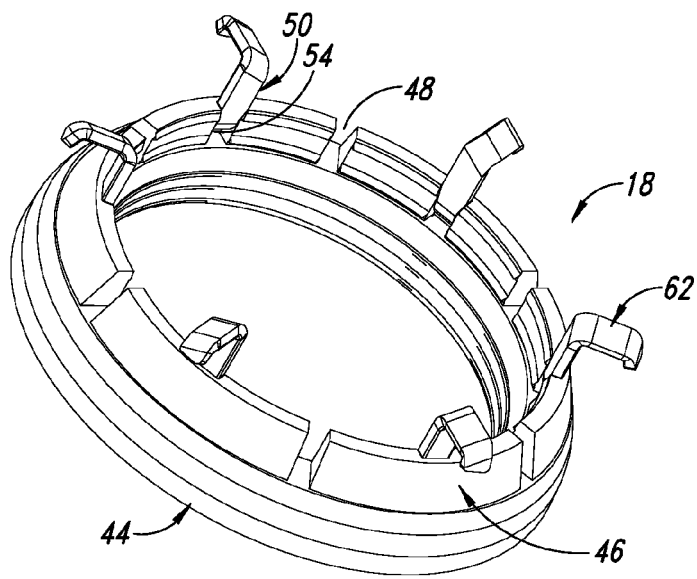
FIG. 7 is a view of a gasket assembly with grippers in one embodiment.

The gasket assembly 18 will now be further described with reference to FIGS. 7-10. Referring to FIG. 7, the gasket assembly 18 includes an annular rubber gasket member 44. The gasket member 44 (or "gasket") has the cross-section illustrated in FIG. 4 when it is in a relaxed or "non-tightened" condition. A plurality of gripper members 46 rest on an upper surface 48 of gasket 44. The gripper members 46 are held in an annular arrangement around the gasket 44 by draw linkages 50 that are also distributed around the gasket 44.

Figure 10:
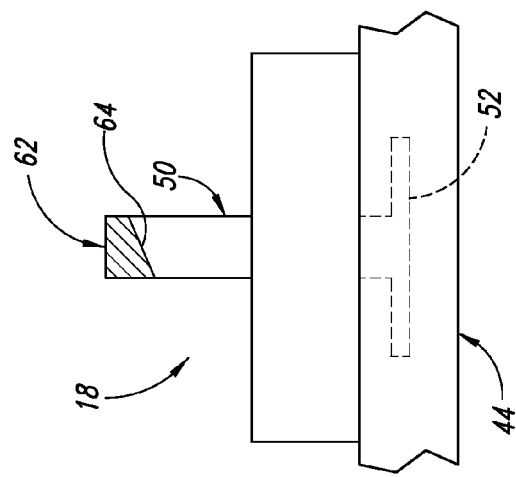
FIG. 10 is a view of a draw linkage that makes up part of the gasket assembly sectioned through a draw hook portion at the end of the linkage
Figure 9:
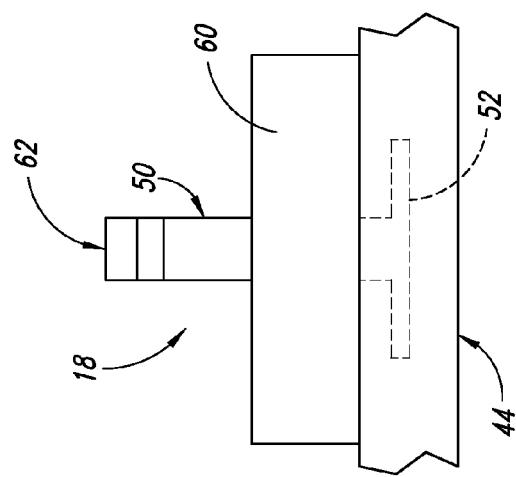
FIG. 9 is a view of a draw linkage that makes up part of the gasket assembly, looking radially inward towards the center of the gasket assembly illustrated in FIG. 7.
Figure 8:
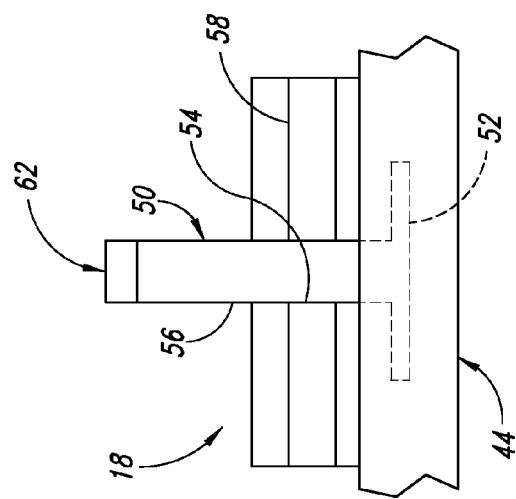
FIG. 8 is a back-side view of a draw linkage that makes up part of the gasket assembly, looking radially outward from the center of the gasket assembly illustrated in FIG. 7.

Referring now to FIGS. 8-10, each draw linkage 50 has a base portion 52 that is embedded in the gasket material 44, thus connecting the draw hook 50 to the gasket. Each gripper member 46 has a slot 54 that fits to and around on three sides of a stem portion 56 of each respective draw linkage 50. This allows each gripper member 46 to be held at a specific annular position relative to the other gripping members, but with no fixed connection with either the gasket 44 or draw linkages 50, so that the gripper members 46 can move independently as the gasket assembly is tightened about a pipe. This independent motion can allow the gripper members to engage a variety of pipe sizes and shapes, regardless of whether they are perfectly round or have a degree of eccentricity.

FIG. 8 is a view that looks from the inside to the outside (radially) relative to the generally annular configuration of gasket assembly 18. Reference numeral 58 points to gripper "teeth," which will be further described below. FIG. 9 is a view from the outside-in (radially). The outer surface 60 of each gripper member 46 is smooth for reasons described below. As can be seen, the slot 54 in the gripper member 46 extends only partially through the lateral thickness of the gripper member for receiving the draw linkage's stem 56.

Referring now to FIGS. 7 and 10 at the same time, each draw linkage 50 has an upper "hook" portion or draw hook 62. The inner part of the hook 62 is sloped, as shown at 64 in FIG. 10. This sloped part 64 respectively rides on one of the plurality of ramp sections 30 of an end ring 20. As a consequence, when the end ring 20 is rotationally turned by the bolt mechanism described above (i.e., by one of the two tightening bolts 26), a sliding/camming action is created between the sloped surfaces of ramp sections 30 and the sloped surfaces 64, respectively. This functions to "draw" gasket 44 outwardly, as further described below.

Figure 11:
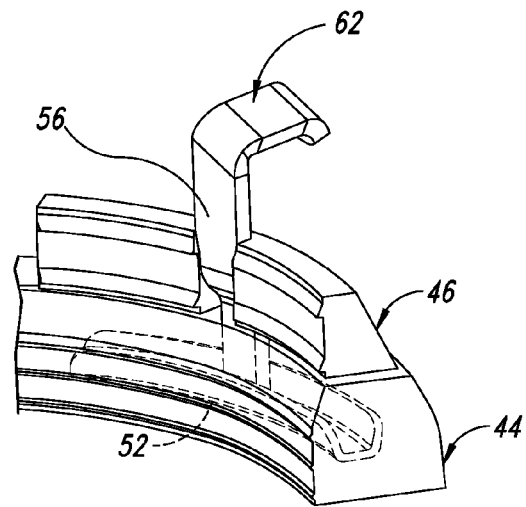
FIG. 11 is a sectioned, pictorial view of a section of the gasket assembly illustrated in FIG. 7.
Figure 12:
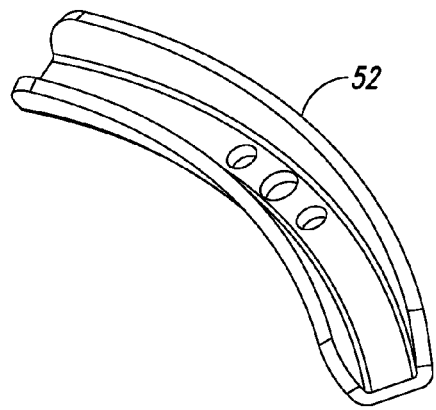
FIG. 12 is a pictorial view of the inner portion of the draw linkage illustrated in FIG. 11.
Figure 13:
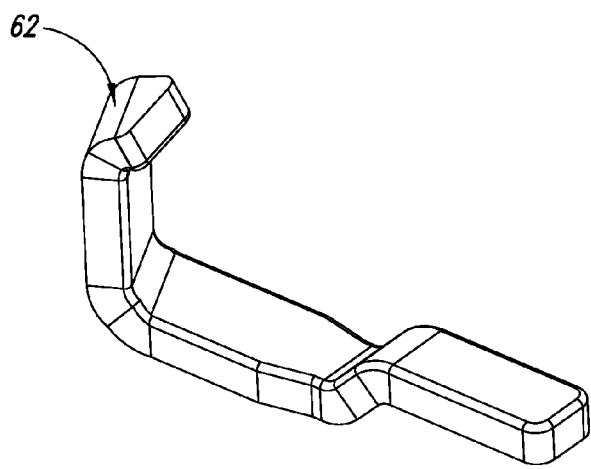
FIG. 13 is a pictorial view of the outer portion of the draw linkage illustrated in FIG. 11.

FIGS. 11-13 provide further illustrations of the draw linkages 50 previously described. The shape of the draw linkages 50 may vary depending on the forming method used. In FIGS. 11-13, for example, each draw linkage 50 is connected to a base piece 52 that is embedded in the gasket material 44. The stem portion 56 may be welded to the base piece 52. Otherwise, the embodiments shown in FIGS. 11-13 is the same as the foregoing description.

V. Operation

FIGS. 4 and 5 illustrate how the various parts described above cooperate to clamp a pipe's end to the fitting 10. Referring first to FIG. 4, the pipe 66 is inserted into an open end (indicated generally at 68) of the coupling body 10 with the inner-most end of the pipe 70 terminating somewhere inside barrel sleeve 12 (see FIG. 3). In other examples, depending on the type of fitting, the inner-most end of the pipe 70 may extend through and protrude beyond the end of the fitting. The barrel portion 12 has an inside tapered surface 72. In this example, the tapered surface 72 symmetrically converges toward the coupling's open end. In other words, tapered surface 72 symmetrically converges around a center-line axis, moving from inside the coupling in a direction toward the outside. In this example, the outer surface 74 of gasket 44 and the outer smooth surface 60 of the gripper member 46 (previously described) has a similar slope that matches the slope of tapered surface 72.

When the end ring 20 is "tightened" by the bolt mechanism (i.e., driven in rotation by tightening bolt 26), the sloped ramp sections 30 on the end ring 20 draws the draw hooks 62 axially outwardly, in the direction indicated by arrow 76 in FIG. 5. This likewise draws or pulls the gasket 44 and gripper members 46 against the inside tapered surface 72 of the barrel sleeve and forces the gasket 44 and gripper members 46 against the pipe 70, thus wedging gaskets and grippers between the sleeve and pipe. In this respect, the gasket 44 slides from the inside, toward the outside, against the converging, tapered surface of the barrel sleeve 12 and is restrained between the inner wall 72 of the barrel and the outer wall 78 of the pipe, thereby compressing the gasket 44 in the manner shown in FIG. 5. Each gripper member 46 is similarly drawn into the restrained position between barrel and pipe surfaces 72, 78, with the gripper teeth 58 of each gripper member being driven into the outer surface of the pipe.

As is best seen in the exploded view, FIG. 2, each end 22, 24 of the pipe coupling has a plurality of slots 80 distributed around the periphery. These slots match the location of the draw hooks 50 and accomplish at least two functions. First, slots 80 provide sufficient distance of travel, sometimes referred to as throw or draw, for the hooks 50 to cam against the ramp sections 30 of the end ring. Second, slots 80 prevent the gasket assembly 18 from rotating when end ring 20 rotates. In other words, the combination of the draw hooks 50 fitting within slots 80 constrains the gasket from rotation as it is drawn outwardly by rotation of the end ring 20. The slots 80 are sized relative to the draw hook stems 56 so that they may slide axially outwardly, and flex, as needed, during the course of the drawing action just described.

Overall, the clamping assembly described above creates a unique draw mechanism that pulls the gasket 44 outwardly against the taper of the barrel portion 12 (see vector 100 in FIG. 5) and compresses or wedges the gasket 44 with a compressive force (see vector 102).

Figure 14:
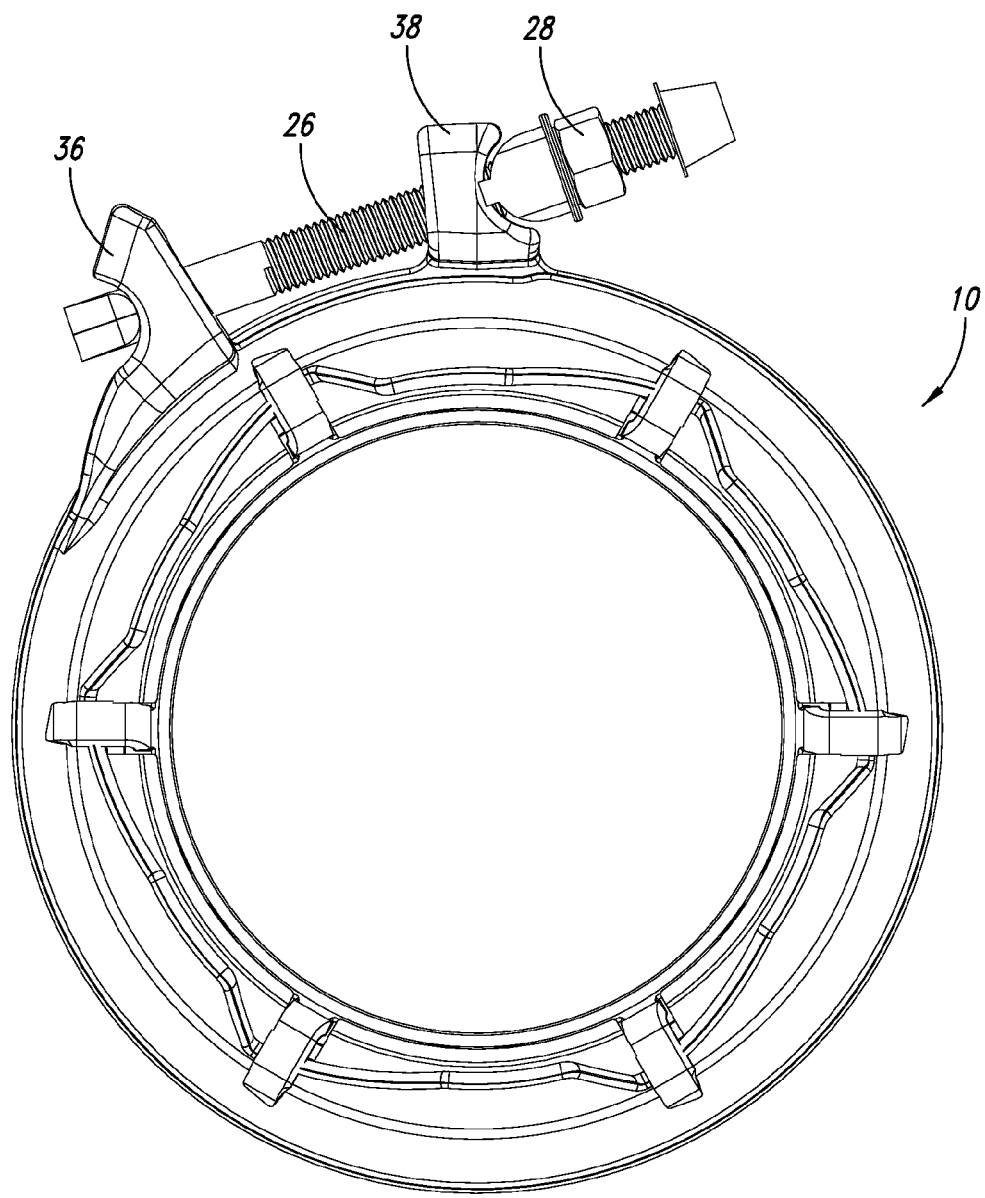
FIG. 14 is an end view of the pipe coupling illustrated in FIG. 1, with the pipe coupling illustrated in an "open" or untightened condition.
Figure 15:
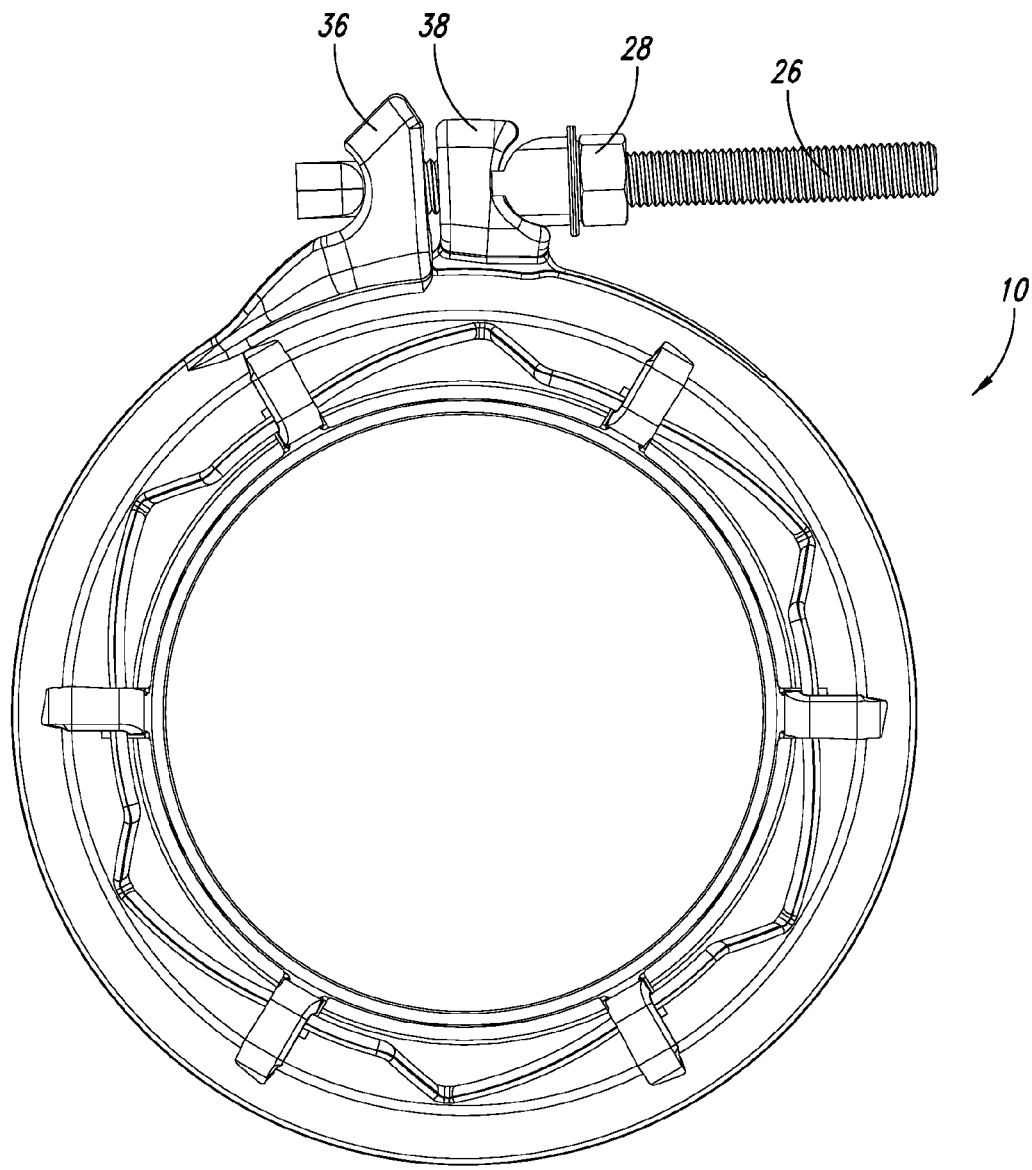
FIG. 15 is an end view of the pipe coupling illustrated in FIG. 1, with the pipe coupling illustrated in a closed or "tightened" condition.

Referring to FIGS. 14 and 15, one of the advantages of the foregoing design is that it is easy to use. Because of the gripper members 46, a person skilled in the art would recognize the pipe sealing action described above as a "restraint" system where a resilient seal (with gripper teeth) is wedged between the pipe and the pipe coupling. In the present design, the tightening action is accomplished via one bolt at each end that is orientated cross-wise to the coupling's axis of symmetry. The force of tightening the bolt is perpendicularly transferred to the gasket 44 via the clamping assembly just described. However, mechanically drawing the seal or gasket 44 with force from inside the fitting 10 toward the outside, is opposite from the way conventional systems have worked in the past. In essence, the mechanical linkage that transfers force from the tightening bolt mechanism is accomplished by the combination of end ring 20 coupled to the draw linkages 50 that ride upon sloped surfaces 30 as the end ring 20 turns. In some examples, and depending on how the nut 28 and bolt 26 are mounted to the lugs, end ring 20 rotates in one direction, or the other, depending on whether the tightening force is applied or relaxed (which is dependent on how the nut 28 on the tightening bolt 26 is turned).

Referring now to FIG. 14, the sleeve includes a tightening bolt receiver 38, and to the end ring includes a similar bolt receiver 36. These two receivers 36, 38 are connected by the threaded bolt 26 and nut 28. FIG. 14 illustrates an "open" condition. Tightening the nut 28 causes the two bolt receivers 36, 38 to close with rotation of the nut 28 about the threaded bolt 26, to the closed position illustrated in FIG. 15. As previously described, this action rotates the end ring 20 and draws the linkages 50 along the axially outward path that draws and wedges the gasket 44 and gripper members 46 between the sleeve's inner wall 72 and outer surface 78 of the pipe. Releasing the nut 28 allows the gasket assembly 18 to "relax" and the end ring 20 reverses its rotational direction.

VI. Additional Configurations

Figure 16:
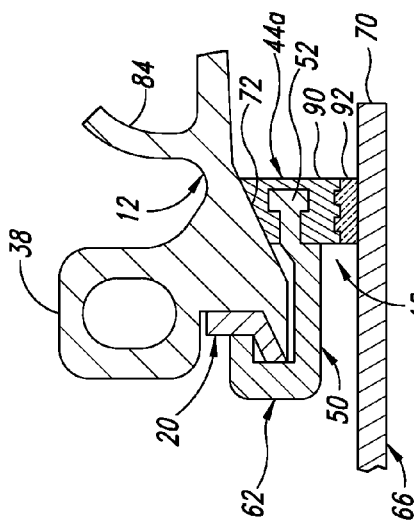
FIG. 16 illustrates an embodiment of a seal that has multiple layers for adjusting to different pipe sizes.
Figure 17:
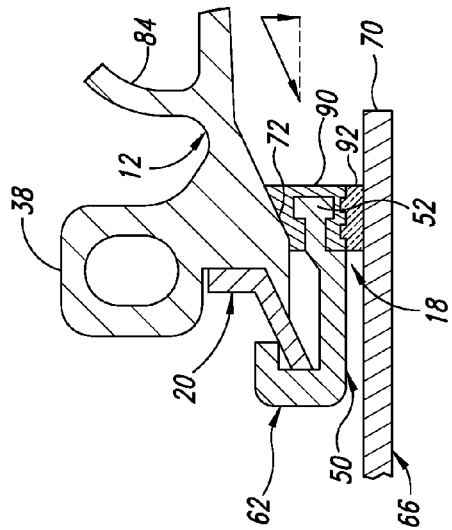
FIG. 17 illustrates a multi-layer seal.
Figure 20:
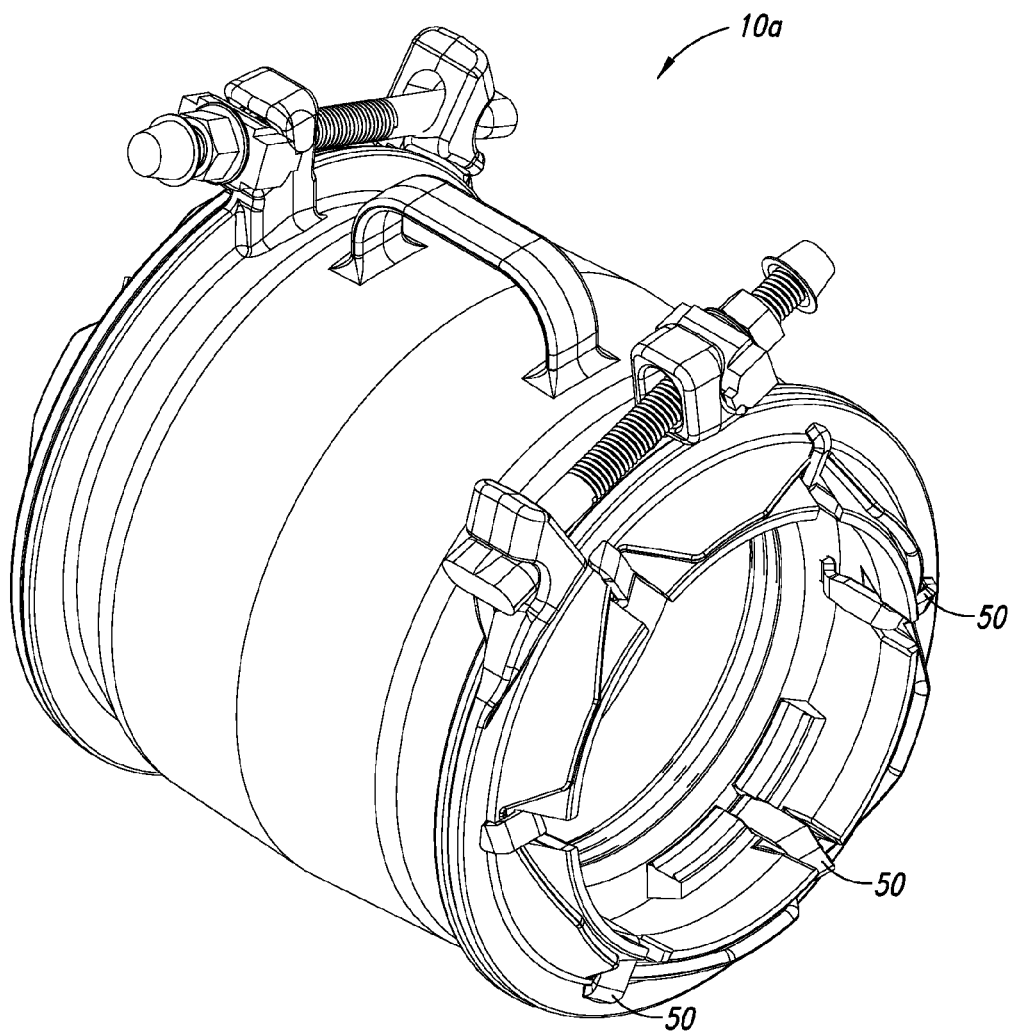
FIG. 20 illustrates a coupling that includes less grippers than draw hooks.

Other embodiments of the foregoing design may relate to changes in the configuration of the gasket assembly illustrated at 18 in FIG. 6. Referring to FIG. 16, for example, it may be possible to implement the draw mechanism described above (translation of "perpendicular" force to an axial "draw") without "restraint," i.e., without using the gripper members 46. Likewise, it is also possible to use gripper members on some, but not all of the of the draw hooks. For example, FIG. 20 illustrates a fitting, which in this example is a pipe coupling 10*a*, that includes fewer gripper members 46 than lugs 50.

Figure 18:
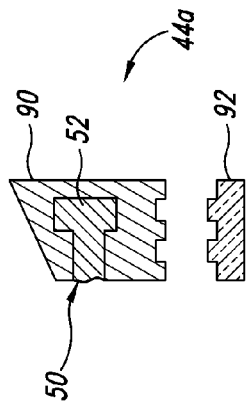
FIG. 18 is a sectional view of the multi-layer seal illustrated in FIGS. 16 and 17.
Figure 19:
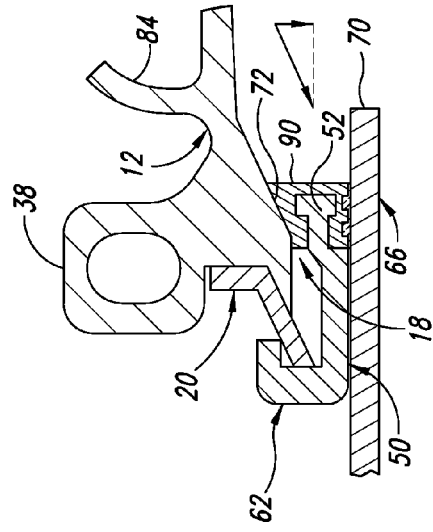
FIG. 19 illustrates the multi-layer seal of FIG. 17 with the inner layer removed.

As a further change, the gasket 44, itself may be manufactured as a multi-layer, "extended range" gasket having outer and inner seal. For example, FIG. 18 illustrates a gasket 44*a* that includes an inner layer 92 that can be "removable" from an outer layer 90 so as to enable the gasket 44*a* to adjust to different pipe diameters (see, FIG. 19). This provides a certain amount of "extended" range. Otherwise, operation of the gasket assembly in FIGS. 16-19 remains the same as described above.

Figure 21:
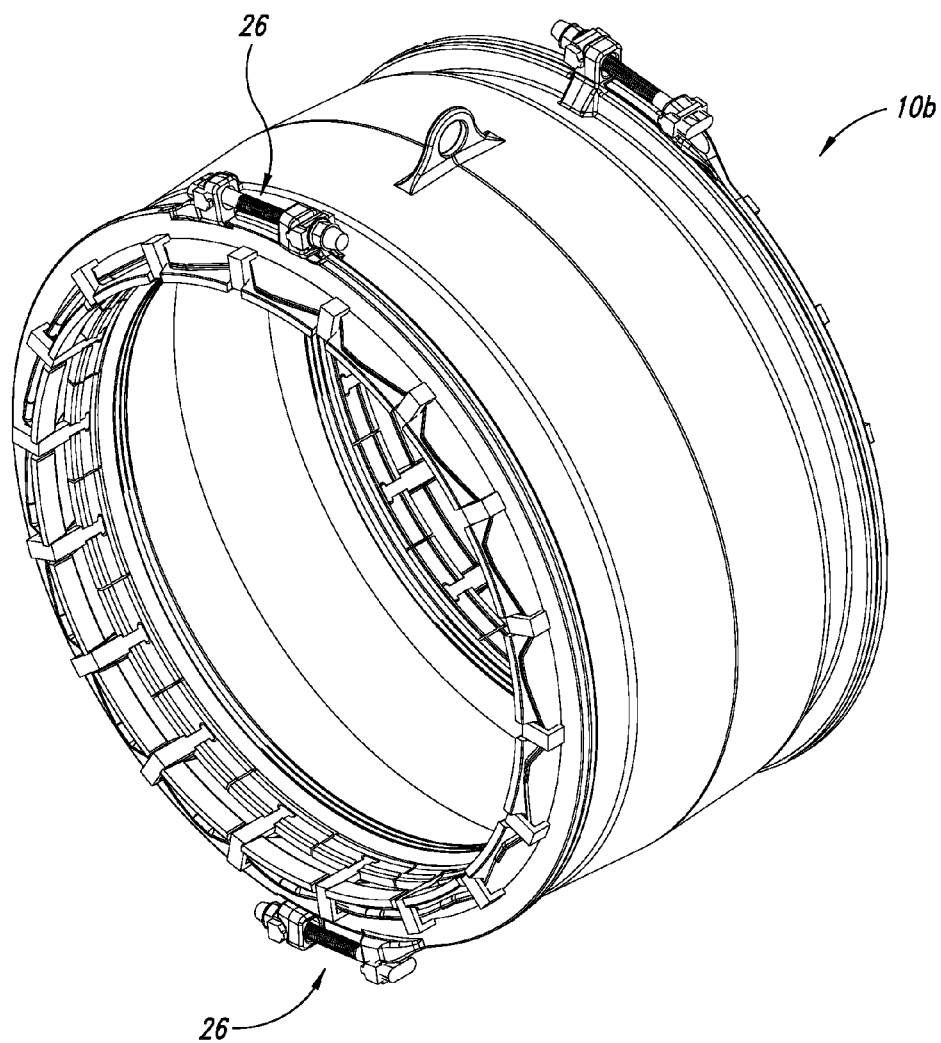
FIG. 21 illustrates a coupling that includes two bolts on either end.

The pipe coupling described and illustrated here is a "one-bolt" system that uses a single tightening bolt 26 for each end ring 20. However, other couplings that include more than one bolt on each end are also within the scope of the present disclosure. For example, FIG. 21 illustrates a fitting 10*b* that includes two bolts 26 on either end.

Further, although the tightening mechanism is described in the foregoing examples as a bolt mechanism, other mechanisms that create a perpendicular force adequate to rotate the end ring also fall within the scope of the present disclosure.

Figure 22A:
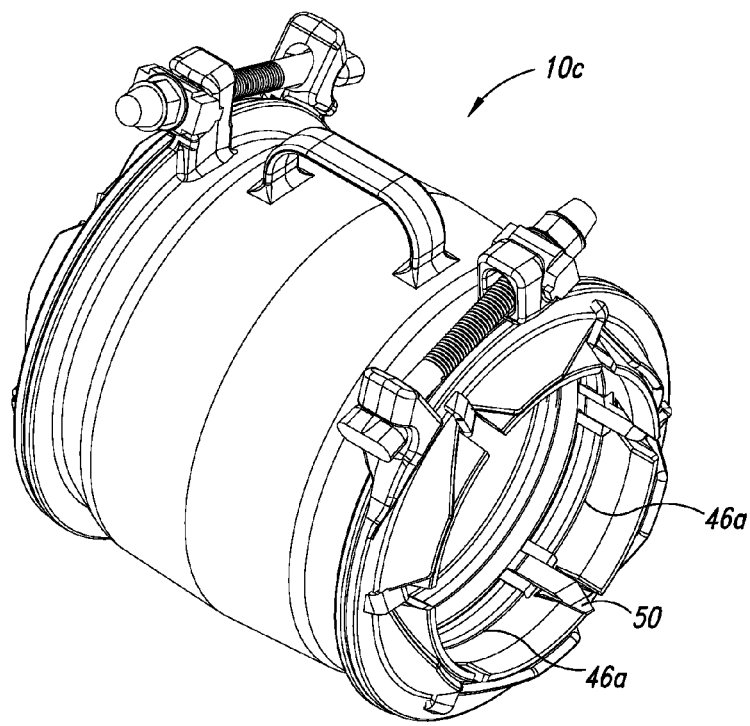
FIG. 22a illustrates a coupling with grippers arranged between adjacent draw hooks.
Figure 22B:
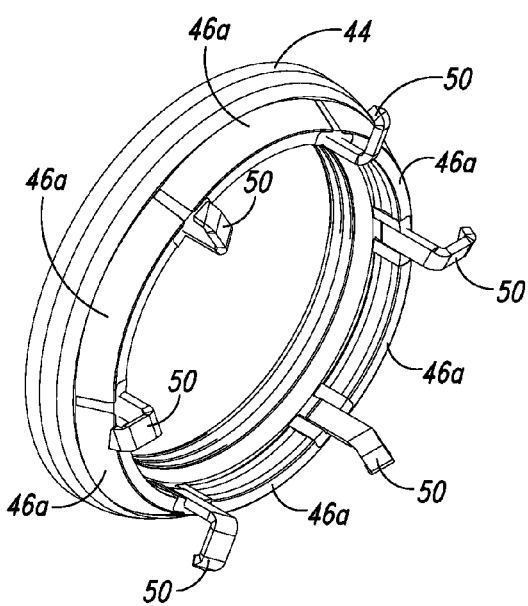
Figure 22C:
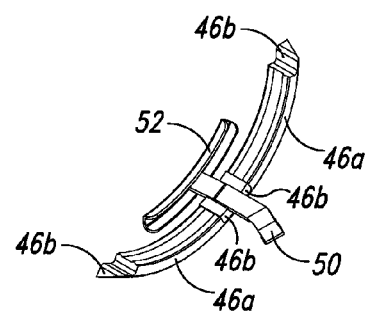

In another example, the grippers are positioned between adjacent draw hooks. FIG. 22*a* illustrates a fitting 10*c* that includes grippers 46*a* positioned between adjacent draw hooks 50. As shown in FIG. 22*b*, the draw hooks 50 are coupled to a gasket 44. The grippers 46*a* may or may not be temporarily coupled to the gasket 44 for the purpose of initial placement during installation. For example, the grippers 46*a* may be temporarily adhered to the gasket 44 to facilitate installation. FIG. 22*a* further illustrates that the grippers 46*a* may include extensions 46*b* that project over the draw hook 50 without directly contacting the draw hook 50.

In another example, which is not depicted, the grippers may be an integral part of the gasket. In this example, the drawing the gasket radially inward will also engage the grippers that are integral with the gasket.

VII. Materials and Manufacture

While there are different ways of manufacturing the parts described above, many of the foregoing parts, like the barrel sleeve 12 and end ring 20, for example, can be cast. Gasket 44 could be made of a conventional rubber material. The gripper members 46 and draw hooks 50 could be fabricated from a variety of materials, such as steel, stainless steel, or ductile iron, for example. The barrel sleeve 12 may include a handle 84 which makes the coupling easier to use. As noted above, although the fitting 10 is described here as an end-to-end coupling, it could be configured in other ways such as a "T" coupling or a single-end coupling, depending on the application.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A fitting, comprising:
a hollow body that includes an opening at a first end;
a sealing member positioned on an interior surface of the hollow body;
a draw mechanism including a primary actuation element coupled with the hollow body at the first end, and a plurality of secondary actuation elements coupled to the sealing member, the plurality of secondary actuation elements positioned in an interior of the hollow body and circumferentially spaced from each other, the plurality of secondary actuation elements engaged with the primary actuation element such that actuation of the primary actuation element draws the plurality of secondary actuation elements axially towards the opening at the first end of the hollow body, thereby translating the sealing member from an open position to a sealing position;

wherein the primary actuation element includes a plurality of sloped surfaces and each one of the secondary actuation elements is engaged with a respective one of the plurality of sloped surfaces.

2. The fitting of claim 1, further comprising a gripping element coupled to one of the plurality of secondary actuation elements such that the gripping element is moved axially towards the opening at the first end of the hollow body and radially inward towards a longitudinal axis of the hollow body from an open position to an engaged position by actuating the primary actuation element.

3. The fitting of claim 2, wherein the gripping element abuts the sealing member.

4. The fitting of claim 3, wherein the gripping element is not fixedly attached to either of the one of the plurality of secondary actuation members or the sealing member.

5. The fitting of claim 1, further comprising a plurality of gripping elements, each of the gripping elements coupled to one of the plurality of secondary actuation elements such that the plurality of gripping elements are moved axially towards the first end of the hollow body and radially inward towards a longitudinal axis of the hollow body from an open position to an engaged position by actuating the primary actuation element.

6. The fitting of claim 1 wherein the hollow body also includes an opening at an opposing, second end.

7. The fitting of claim 1 wherein the hollow body includes an end cap at an opposing, second end.

8. The fitting of claim 1 wherein the hollow body is a portion of a hydrant.

9. The fitting of claim 1 wherein the hollow body is a portion of a valve.

10. A fitting, comprising:
a hollow body that includes an opening at a first end;
a sealing member positioned on an interior surface of the hollow body;
a draw mechanism including a primary actuation element coupled with the hollow body at the first end, and a plurality of secondary actuation elements coupled to the sealing member, the plurality of secondary actuation elements positioned in an interior of the hollow body and circumferentially spaced from each other, the plurality of secondary actuation elements engaged with the primary actuation element such that actuation of the primary actuation element draws the plurality of secondary actuation elements axially towards the opening at the first end of the hollow body, thereby translating the sealing member from an open position to a sealing position;

wherein the first end of the hollow body includes a plurality of circumferentially spaced tapered tabs that converge towards a longitudinal axis at the first end, adjacent ones of the tabs being separated in the first circumferential direction by longitudinally extending slots and wherein the secondary actuation members each extend through a respective one of the longitudinally extending slots.

11. The fitting of claim 10, further comprising a gripping element coupled to one of the plurality of secondary actuation elements such that the gripping element is moved axially towards the opening at the first end of the hollow body and radially inward towards a longitudinal axis of the hollow body from an open position to an engaged position by actuating the primary actuation element.

12. The fitting of claim 11, wherein the gripping element abuts the sealing member.

13. The fitting of claim 12, wherein the gripping element is not fixedly attached to either of the one of the plurality of secondary actuation members or the sealing member.

14. The fitting of claim 10, further comprising a plurality of gripping elements, each of the gripping elements coupled to one of the plurality of secondary actuation elements such that the plurality of gripping elements are moved axially towards the first end of the hollow body and radially inward towards a longitudinal axis of the hollow body from an open position to an engaged position by actuating the primary actuation element.

15. A fitting, comprising:
a hollow body that includes an opening at a first end;
a sealing member positioned on an interior surface of the hollow body;
a draw mechanism including a primary actuation element coupled with the hollow body at the first end, and a plurality of secondary actuation elements coupled to the sealing member, the plurality of secondary actuation elements positioned in an interior of the hollow body and circumferentially spaced from each other, the plurality of secondary actuation elements engaged with the primary actuation element such that actuation of the primary actuation element draws the plurality of secondary actuation elements axially towards the opening at the first end of the hollow body, thereby translating the sealing member from an open position to a sealing position;

wherein the primary actuation element is rotatably coupled with the hollow body at the first end and rotation of the primary actuation element in a first circumferential direction with respect to a longitudinal axis of the hollow body draws the plurality of secondary actuation elements axially towards the opening at the first end of the hollow body, thereby dragging the sealing member from an open position to a sealing position.

16. The fitting of claim 15, wherein the hollow body is coupled to the primary actuation element such that the primary actuation element is rotated in the first circumferential direction by actuating at least one bolt.

17. The fitting of claim 15, further comprising a bolt that extends from a first lug that extends from the hollow body to a second lug that extends from the primary actuation element, wherein the first and second lugs are positioned such that actuating the bolt causes the primary actuation element to rotate in the first circumferential direction.

18. The fitting of claim 15, further comprising a gripping element coupled to one of the plurality of secondary actuation elements such that the gripping element is moved axially towards the opening at the first end of the hollow body and radially inward towards a longitudinal axis of the hollow body from an open position to an engaged position by actuating the primary actuation element.

19. The fitting of claim 18, wherein the gripping element abuts the sealing member.

20. The fitting of claim 19, wherein the gripping element is not fixedly attached to either of the one of the plurality of secondary actuation members or the sealing member.

21. The fitting of claim 15, further comprising a plurality of gripping elements, each of the gripping elements coupled to one of the plurality of secondary actuation elements such that the plurality of gripping elements are moved axially towards the first end of the hollow body and radially inward towards a longitudinal axis of the hollow body from an open position to an engaged position by actuating the primary actuation element.

22. A fitting, comprising:
a hollow body that includes an opening at a first end;
an annular sealing member positioned on an interior surface of the hollow body; and
an actuation mechanism configured to draw the sealing member axially towards the first end of the hollow body and radially inward towards a longitudinal axis of the hollow body by actuating at least one bolt that is coupled to the hollow body and the actuation mechanism, the at least one bolt extending substantially transverse to the longitudinal axis of the hollow body; and
a plurality of restraining elements circumferentially arranged on the interior surface of the hollow body, the plurality of restraining elements being arranged axially between the sealing member and the first end of the hollow body.

23. A fitting, comprising:
a hollow body that includes an opening at a first end;
an annular sealing member positioned on an interior surface of the hollow body; and
an actuation mechanism configured to draw the sealing member axially towards the first end of the hollow body and radially inward towards a longitudinal axis of the hollow body by actuating at least one bolt that is coupled to the hollow body and the actuation mechanism, the at least one bolt extending substantially transverse to the longitudinal axis of the hollow body;
wherein the actuation member includes a ring rotatably mounted to the hollow body and a plurality of follower elements, and each of the follower elements are coupled to the annular sealing ring, and
wherein the at least one bolt is coupled to the ring such that actuating the at least one bolt causes the ring to rotate in a circumferential direction with respect to the hollow body, and the plurality of follower elements engage the ring such that rotation of the ring causes the plurality of follower elements to translate towards the first end of the hollow body.

24. The fitting of claim 23, wherein the ring includes a plurality of cam surfaces that vary in axial length along the circumferential direction, and each one of the follower elements includes an engagement portion that engages a respective one of the cam surfaces of the ring.

25. The fitting of claim 24, wherein the engagement portion of each of the follower elements is a hook.

26. The fitting of claim 25, wherein the hook includes a sloped portion that corresponds in shape to an axial end surface of the cam surfaces of the ring.

27. The fitting of claim 25, wherein the ring is mounted to an external surface of the hollow body, the first end of the hollow body includes a plurality of circumferentially spaced slots that extend through the hollow body from the external surface of the hollow body to the internal surface of the hollow body and that extend substantially parallel to the longitudinal axis of the hollow body, and the hook on each one of the follower elements extends through a respective one of the slots in the hollow body.

28. The fitting of claim 23, wherein ring includes a first bolt receiver, the hollow body includes a second bolt receiver, and the at least one bolt extends through the first and second bolt receivers.

29. The fitting of claim 23, wherein each follower element includes a stem that extends axially from the engagement portion to a base portion, and the base portion is coupled to the annular sealing member.

30. The fitting of claim 23, further comprising a plurality of restraining elements arranged circumferentially on the interior surface of the hollow body between adjacent follower elements and axially between the sealing member and the first end of the hollow body.

* * * * *